United States Patent
Song et al.

(10) Patent No.: US 11,708,512 B2
(45) Date of Patent: Jul. 25, 2023

(54) ADHESIVE COMPOSITION FOR FOLDABLE DISPLAY, ADHESIVE FILM USING SAME, AND FOLDABLE DISPLAY COMPRISING SAME

(71) Applicant: LG CHEM, LTD., Seoul (KR)

(72) Inventors: Hee Song, Daejeon (KR); Hyon Gyu Park, Daejeon (KR); Hyun Cheol Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 109 days.

(21) Appl. No.: 16/765,745

(22) PCT Filed: Feb. 1, 2019

(86) PCT No.: PCT/KR2019/001435
§ 371 (c)(1),
(2) Date: May 20, 2020

(87) PCT Pub. No.: WO2019/151824
PCT Pub. Date: Aug. 8, 2019

(65) Prior Publication Data
US 2020/0291276 A1 Sep. 17, 2020

(30) Foreign Application Priority Data

Feb. 2, 2018 (KR) .................. 10-2018-0013388

(51) Int. Cl.
*C09J 133/08* (2006.01)
*B32B 7/12* (2006.01)
(Continued)

(52) U.S. Cl.
CPC .............. *C09J 133/08* (2013.01); *B32B 7/12* (2013.01); *C09J 7/00* (2013.01); *C09J 7/10* (2018.01);
(Continued)

(58) Field of Classification Search
CPC . B32B 7/12; B32B 2457/20; B32B 2457/208; C08F 220/1808; C09J 7/00;
(Continued)

(56) References Cited

U.S. PATENT DOCUMENTS

2005/0244633 A1  11/2005  Kobayashi et al.
2011/0033720 A1   2/2011  Fujita et al.
(Continued)

FOREIGN PATENT DOCUMENTS

CN   103897620 A    7/2014
JP   2011-074308 A  4/2011
(Continued)

OTHER PUBLICATIONS

International Search Report and Written Opinion issued for International Application No. PCT/KR2019/001435 dated May 13, 2019, 8 pages.

*Primary Examiner* — Eli D. Strah
(74) *Attorney, Agent, or Firm* — Rothwell, Figg, Ernst & Manbeck, P.C.

(57) ABSTRACT

The present application provides an adhesive composition for a foldable display including a thermocurable resin; and a crosslinking agent, wherein the thermocurable resin includes a unit derived from a compound including at least one N or O; and at least one unshared electron pair in the molecule, and the thermocurable resin has a glass transition temperature of −70° C. or lower, an adhesive film using the same, and a foldable display including the same.

11 Claims, 1 Drawing Sheet

| 107 |
|---|
| 106 |
| 105 |
| 104 |
| 103 |
| 102 |
| 101 |

(51) Int. Cl.
  *C09J 201/02* (2006.01)
  *C09J 7/00* (2018.01)
  *C09J 7/10* (2018.01)
  *G02F 1/1333* (2006.01)

(52) U.S. Cl.
  CPC ......... *C09J 201/02* (2013.01); *B32B 2457/20* (2013.01); *B32B 2457/208* (2013.01); *C09J 2203/318* (2013.01); *C09J 2301/312* (2020.08); *C09J 2433/00* (2013.01); *C09K 2323/05* (2020.08); *C09K 2323/057* (2020.08); *G02F 1/133305* (2013.01); *G02F 2202/28* (2013.01)

(58) Field of Classification Search
  CPC ...... C09J 133/02; C09J 133/08; C09J 201/02; C09J 201/025; C09J 201/08; C09J 2203/318; C09J 2301/312; C09J 2433/00; C09K 2323/05; C09K 2323/057; G02F 1/133305; G02F 2202/28
  See application file for complete search history.

(56) References Cited

U.S. PATENT DOCUMENTS

| | | |
|---|---|---|
| 2013/0163255 A1 | 6/2013 | Kim |
| 2013/0211028 A1 | 8/2013 | Shinike et al. |
| 2014/0184053 A1 | 7/2014 | Cho et al. |
| 2015/0075709 A1 | 3/2015 | McArdle et al. |
| 2015/0201487 A1* | 7/2015 | Kee .................. G02F 1/133305 361/749 |
| 2016/0083629 A1* | 3/2016 | Wang ..................... C08L 33/08 522/74 |
| 2017/0081567 A1* | 3/2017 | Ha .......................... C08F 2/001 |
| 2017/0121564 A1 | 5/2017 | Cho et al. |
| 2017/0240782 A1 | 8/2017 | Suwa et al. |
| 2018/0061893 A1* | 3/2018 | Breedlove ............ G06F 3/0412 |
| 2019/0292414 A1 | 9/2019 | Higashi et al. |

FOREIGN PATENT DOCUMENTS

| | | | |
|---|---|---|---|
| JP | 2012-041456 A | 3/2012 | |
| JP | 2016-050239 A | 4/2016 | |
| JP | 2017-095653 A | 6/2017 | |
| JP | 2017095653 A * | 6/2017 | ............ C08F 220/18 |
| KR | 2006-0047584 A | 5/2006 | |
| KR | 2011-0002857 A | 1/2011 | |
| KR | 2013-0073297 A | 7/2013 | |
| KR | 2015-0040793 A | 4/2015 | |
| KR | 10-2016-0065030 A | 6/2016 | |
| KR | 2017-0051707 A | 5/2017 | |
| KR | 10-2017-0062369 A | 6/2017 | |
| KR | 20170078510 A * | 7/2017 | ............ C08F 220/18 |
| KR | 2017-0097850 A | 8/2017 | |
| KR | 2017-0097851 A | 8/2017 | |
| KR | 10-1780542 B1 | 9/2017 | |
| KR | 2018-0001423 A | 1/2018 | |
| TW | 201005059 A | 2/2010 | |
| WO | 2014-109223 A1 | 7/2014 | |
| WO | WO-2014109223 A1 * | 7/2014 | ............ C09J 167/07 |
| WO | 2018-012161 A1 | 1/2018 | |
| WO | WO-2018102179 A1 * | 6/2018 | ............... B32B 7/12 |

* cited by examiner

【FIG. 1】
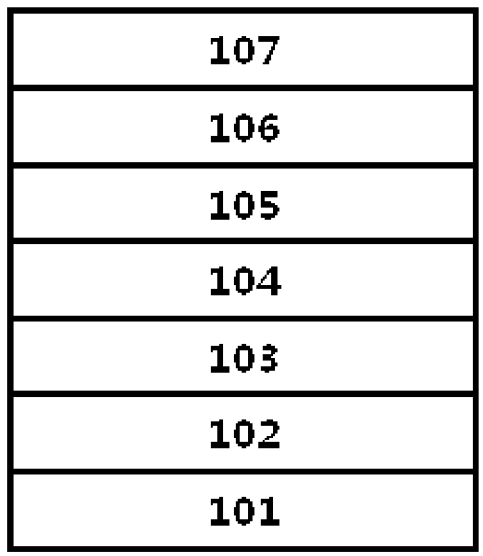
【FIG. 2】
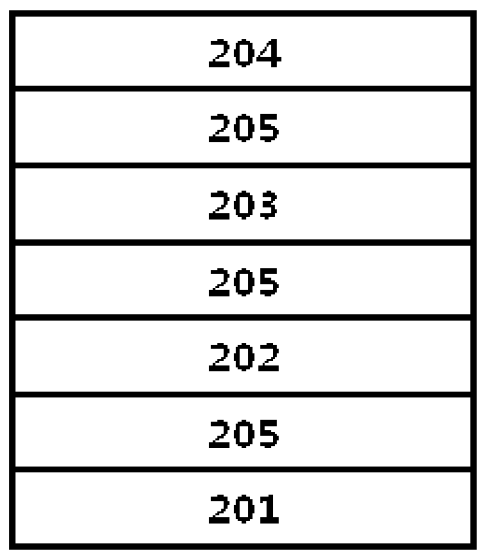

ADHESIVE COMPOSITION FOR FOLDABLE DISPLAY, ADHESIVE FILM USING SAME, AND FOLDABLE DISPLAY COMPRISING SAME

TECHNICAL FIELD

The present application relates to an adhesive composition for a foldable display, an adhesive film using the same, and a foldable display including the same.

The application is a 35 U.S.C. 371 National Phase Entry Application from PCT/KR2019/001435 filed on Feb. 1, 2019, designating the United States and which claims priority to and the benefits of Korean Patent Application No. 10-2018-0013388, filed with the Korean Intellectual Property Office on Feb. 2, 2018, the entire contents of which are incorporated herein by reference.

BACKGROUND OF THE INVENTION

With recent development of display-relating technologies, display devices transformable at the stage of use such as folding, rolling to a roll shape or stretching like a rubber band have been researched and developed. These displays may be transformed into various shapes, and therefore, may satisfy demands for both a larger display at the stage of use and a smaller display for portability.

A transformable display device may be transformed into various shapes in response to user demands or in accordance with needs of the situation in which the display device is used as well as transformed into shapes set in advance. Accordingly, the transformed shape of the display needs to be recognized, and the display device needs to be controlled in response to the recognized shape.

Meanwhile, a transformable display device has a problem in that each constitution of the display device may be damaged by transformation, and therefore, each constitution of such a display device needs to satisfy folding reliability and stability.

Brief Description of the Invention

The present application is directed to providing an adhesive composition for a foldable display, an adhesive film using the same, and a foldable display including the same.

One embodiment of the present application provides an adhesive composition for a foldable display including a thermocurable resin; and a crosslinking agent, wherein the thermocurable resin includes a unit derived from a compound including at least one N or O; and at least one unshared electron pair in the molecule, the thermocurable resin has a glass transition temperature of −70° C. or lower, and the compound including at least one N or O; and at least one unshared electron pair in the molecule is represented by the following Chemical Formula 1.

[Chemical Formula 1]

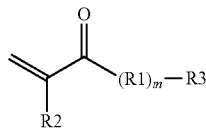

In Chemical Formula 1, R1 is an alkyleneoxy group, R2 is hydrogen; an alkyl group; or a nitrile group, R3 is an alkoxy group, and m is an integer of 1 to 4.

One embodiment of the present application provides an adhesive film including a cured material of the adhesive composition for a foldable display described above.

One embodiment of the present application provides a foldable display including the adhesive film described above.

Advantageous Effects

An adhesive composition for a foldable display according to one embodiment of the present application lowers storage modulus by using a thermocurable resin having a glass transition temperature of −70° C. or lower. When including a unit derived from a compound including N or O and an unshared electron pair in the resin, the compound becomes polar by a dipole moment, and a dipole moment is generated in the adhesive by applying an electric field to the polymer including the compound having polarity. Accordingly, a dipole arrangement is formed inside the adhesive, and dielectric polarizability increases resulting in an increase in the dielectric constant.

BRIEF DESCRIPTION OF DRAWINGS

FIG. 1 is a mimetic diagram of a specimen having a 2-set_stack up structure of a static folding test according to one embodiment of the present specification.

FIG. 2 is a mimetic diagram of a foldable display using an adhesive of the present specification.

REFERENCE NUMERAL

101: Touch Panel or Display Panel
102, 104: Adhesive Layer (PSA: Pressure-sensitive adhesive)
103: Polarizing Film (POL)
105, 107: Hard Coating Layer (HC)
106: Polyimide Layer (PI)
201: Substrate
202: Touch panel or Display panel
203: Polarizing Film
204: Cover Window
205: Adhesive (PSA)

DETAILED DESCRIPTION OF THE INVENTION

Hereinafter, the present specification will be described in more detail.

Embodiments of the present disclosure will be described in detail with reference to accompanying drawings so that those skilled in the art may readily implement the present disclosure. However, the present disclosure may be embodied in various different forms, and is not limited the embodiments described herein.

In the present specification, a description of a certain part "including" certain constituents means capable of further including other constituents, and does not exclude other constituents unless particularly stated on the contrary.

In the present specification, "derived" means that a bond of a compound is broken, or a new bond is formed as a substituent falls off, and a unit derived from the compound may mean a unit connected to the main chain of a polymer. The unit may be included in the main chain in the polymer to form a resin.

One embodiment of the present application provides an adhesive composition for a foldable display including a thermocurable resin; and a crosslinking agent, wherein the thermocurable resin includes a unit derived from a compound including at least one N or O; and at least one unshared electron pair in the molecule, and the thermocurable resin has a glass transition temperature of −70° C. or lower.

One embodiment of the present specification provides an adhesive composition for a foldable display including a thermocurable resin; and a crosslinking agent, wherein the thermocurable resin includes a unit derived from a compound including at least one N or O; and at least one unshared electron pair in the molecule, and the thermocurable resin has a glass transition temperature of −70° C. or lower.

In one embodiment of the present specification, the glass transition temperature of the thermocurable resin satisfies −70° C. or lower, and is preferably higher than or equal to −200° C. and lower than or equal to −70° C. Using a thermocurable resin having a glass transition temperature of −70° C. or lower is effective in lowering storage modulus.

The glass transition temperature of the thermocurable resin according to the present specification is measured using a heat flow of the sample using differential scanning calorimetry (DSC).

In one embodiment of the present specification, the thermocurable resin becomes polar by a permanent dipole moment when including a unit derived from a compound including at least one N or O; and at least one unshared electron pair in the molecule, and when an electric field is applied to the polymer, a dipole moment is generated inside the adhesive forming a dipole arrangement, and dielectric polarizability increases resulting in an increase in the dielectric constant.

In one embodiment of the present specification, the adhesive composition for a foldable display has storage modulus of $10^4$ Pa to $10^6$ Pa at −30° C. and 60° C. after curing. The storage modulus satisfying the above-mentioned range is effective in reducing a bleed-out phenomenon and reducing an impact transfer rate. When the storage modulus is lower than the above-mentioned range, a bleed-out phenomenon occurs reducing process efficiency, and when the storage modulus is higher than the above-mentioned range, a large impact is transferred to a substrate during a folding process causing damages to a display. Accordingly, the adhesive composition for a foldable display of the present disclosure is useful in forming an adhesive layer having bending reliability suitable for a foldable display.

Each layer of a foldable display is subject to physical forces during a folding process. In this case, an adhesive is more likely to be subject to delamination, bubbles, peel-off and the like compared to general displays due to a bleed-out phenomenon and physical impacts, and when an impact transfer rate is high, cracks may readily occur on a cover window in contact with the adhesive during a folding process. Accordingly, it is very important for the adhesive composition for a foldable display to reduce a bleed-out phenomenon of an adhesive and reduce an impact transfer rate.

<Measurement of Storage Modulus>

A film is formed with the adhesive composition according to one embodiment of the present specification using an applicator, and after drying for 3 minutes at 140° C. through a Mathis oven, an adhesive film having a thickness of 20 μm is prepared. The adhesive film is laminated several times and cut into a specimen having a thickness of 1 mm, and storage modulus is measured using a parallel plate fixture having a diameter of 8 mm using an advanced rheometric expansion system G2 (TA Instruments Inc.) at 1 Hz, 5% strain and 10° C./min.

In one embodiment of the present specification, the compound including at least one N or O; and at least one unshared electron pair in the molecule is a compound including at least one nitrile group or alkoxy group; and at least one unshared electron pair in the molecule.

In one embodiment of the present specification, the compound including at least one N or O; and at least one unshared electron pair in the molecule is represented by the following Chemical Formula 1.

[Chemical Formula 1]

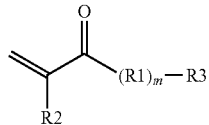

In Chemical Formula 1, R1 is an alkyleneoxy group, R2 is hydrogen; an alkyl group; or a nitrile group, R3 is an alkoxy group, and m is an integer of 1 to 4.

In one embodiment of the present specification, R1 is an ethyleneoxy group (—OCH$_2$CH$_2$—).

In one embodiment of the present specification, R2 is hydrogen, a methyl group or a nitrile group.

In one embodiment of the present specification, R3 is a methoxy group; an ethoxy group; a propoxy group; or a butoxy group.

In one embodiment of the present specification, m is an integer of 1 to 3.

In one embodiment of the present specification, m is 2.
In one embodiment of the present specification, m is 3.
In one embodiment of the present specification, m is 4.
In one embodiment of the present specification, R2 is hydrogen, R1 is an ethyleneoxy group, m is 2, and R3 is an ethoxy group.

In one embodiment of the present specification, the compound represented by Chemical Formula 1 is carbitol acrylate.

In one embodiment of the present specification, the compound including at least one N or O; and at least one unshared electron pair in the molecule and represented by Chemical Formula 1 is effective in reducing modulus by lowering a glass transition temperature of an adhesive for a foldable display, and increasing a relative dielectric constant. On the other hand, methoxyethyl acrylate that does not satisfy Chemical Formula 1 increases a glass transition temperature of an adhesive for a foldable display. As a result, modulus increases, and when using methoxyethyl acrylate in large quantities, folding performance declines.

In one embodiment of the present specification, the crosslinking agent is included in 0.001 parts by weight to 1 parts by weight with respect to 100 parts by weight of the adhesive composition for a foldable display.

In one embodiment of the present disclosure, the crosslinking agent is an epoxy-based crosslinking agent or an isocyanate-based crosslinking agent.

Examples of the epoxy-based crosslinking agent may include ethylene glycol diglycidyl ether, triglycidyl ether, trimethylolpropane triglycidyl ether, N,N,N',N'-tetraglycidyl-1,3-xylenediamine, glycerin diglycidyl ether or the like Examples of the isocyanate-based crosslinking agent may include an aromatic polyisocyanate such as 1,3-phenylene diisocyanate, 4,4'-diphenyl diisocyanate, 1,4-phenylene diisocyanate, 4,4'-diphenylmethane diisocyanate, 2,4-tolylene diisocyanate, 2,6-tolylene diisocyanate, 4,4'-toluidine diisocyanate, 2,4,6-triisocyanate toluene, 1,3,5-triisocyanate benzene, dianisidine diisocyanate, 4,4'-diphenyl ether diisocyanate, 4,4',4''-triphenylmethane triisocyanate, ω,ω-diisocyanate-1,3-dimethylbenzene, ω,ω'-diisocyanate-1,4-dimethylbenzene, ω,ω'-diisocyanate-1,4-diethylbenzene, 1,4-tetramethylxylylene diisocyanate, 1,3-tetramethylxylene diisocyanate or xylylene diisocyanate; an aliphatic polyisocyanate such as trimethylene diisocyanate, tetramethylene diisocyanate, hexamethylene diisocyanate, pentamethylene diisocyanate 1,2-propylene diisocyanate, 2,3-butylene diisocyanate, 1,3-butalene diisocyanate, dodecamethylene diisocyanate or 2,4,4-trimethylhexamethylene diisocyanate; an alicyclic polyisocyanate such as 3-isocyanate methyl-3,5,5-trimethylcyclohexyl isocyanate, 1,3-cyclopentane diisocyanate, 1,3-cyclohexane diisocyanate, 1,4-cyclohexane diisocyanate, methyl-2,4-cyclohexane diisocyanate, methyl-2,6-cyclohexane diisocyanate, 4,4'-methylenebis(cyclohexyl isocyanate) or 1,4-bis(isocyanatemethyl)cyclohexane, or the like, or a reactant of one or more of the above-described polyisocyanates and a polyol.

In one example, by including the crosslinking agent, the adhesive composition of the present application may conduct a crosslinking reaction with a crosslinkable functional group included in the polymer included in the thermocurable resin.

In one embodiment of the present specification, the thermocurable resin is included in 99 parts by weight to 99.999 parts by weight with respect to 100 parts by weight of the adhesive composition for a foldable display.

In one embodiment of the present specification, the unit derived from the compound including at least one N or O; and at least one unshared electron pair in the molecule is included in 10 parts by weight to 98 parts by weight with respect to 100 parts by weight of the thermocurable resin.

In one embodiment of the present specification, the unit derived from the compound including at least one N or O; and at least one unshared electron pair in the molecule is included in 20 parts by weight to 98 parts by weight with respect to 100 parts by weight of the thermocurable resin.

In one embodiment of the present specification, the thermocurable resin includes a unit derived from a compound including an acrylate group.

In one embodiment of the present specification, the compound including an acrylate group is ethylhexyl acrylate or acrylic acid.

In one embodiment of the present specification, the thermocurable resin includes a unit derived from ethylhexyl acrylate or acrylic acid.

In one embodiment of the present specification, the thermocurable resin includes a unit derived from ethylhexyl acrylate and acrylic acid.

In one embodiment of the present specification, the compound including at least one N or O; and at least one unshared electron pair in the molecule and the compound including an acrylate group are different from each other.

The compound including at least one N or O; and at least one unshared electron pair in the molecule according to the present specification is a compound that is polar by a permanent dipole moment. The acrylate compound according to the present specification means a compound that is not polar, and a resin formed only with an acrylate compound having no polarity has a low dielectric constant. Accordingly, using a polar compound including at least one N or O; and at least one unshared electron pair in the molecule is preferred, and this increases a dielectric constant by generating a dipole moment in the adhesive.

In one embodiment of the present specification, the unit derived from the compound including at least one N or O; and at least one unshared electron pair in the molecule is included in 10 parts by weight to 98 parts by weight, and the unit derived from the compound including an acrylate group is included in 2 parts by weight to 90 parts by weight with respect to 100 parts by weight of the thermocurable resin.

In one embodiment of the present specification, the unit derived from the compound including at least one N or O; and at least one unshared electron pair in the molecule is included in 20 parts by weight to 98 parts by weight, and the unit derived from the compound including an acrylate group is included in 2 parts by weight to 80 parts by weight with respect to 100 parts by weight of the thermocurable resin.

In one embodiment of the present specification, the thermocurable resin has a weight average molecular weight of greater than or equal to 1,000,000 g/mol and less than or equal to 2,000,000 g/mol.

In one embodiment of the present specification, the thermocurable resin having a weight average molecular weight of 1,000,000 g/mol or less has a problem of weakening durability, and the weight average molecular weight being 2,000,000 g/mol or greater has a problem of increasing stress when folding due to a decreased coatability.

The weight average molecular weight of the present specification is measured using a method of measuring a general polymer by gel permeation chromatography (GPC), and polystyrene of which molecular weight is already known is used as a base in the measurement.

In one embodiment of the present specification, the adhesive composition for a foldable display may include, in addition to the above-described constitutions, various additives depending on the applications, types of resin components and manufacturing processes of the adhesive layer to describe later within a range not affecting the advantageous effects described above. For example, the adhesive composition may include a moisture absorbent, an inorganic filler, a coupling agent, a crosslinking agent, a curing material, a tackifier, an ultraviolet stabilizer, an antioxidant or the like in a proper content depending on target properties.

One embodiment of the present specification provides an adhesive film including a cured material of the adhesive composition for a foldable display.

In one embodiment of the present specification, the composition is preferably thermally cured.

In one embodiment of the present specification, heat treatment may be conducted after thermal drying by the thermal curing.

In one embodiment of the present specification, the thermal drying is preferably conducted by the thermal curing.

In one embodiment of the present specification, the thermal drying is preferably drying for 1 minute to 10 minutes at 100° C. to 150° C.

In one embodiment of the present specification, the thermal drying is preferably drying for 2 minutes to 4 minutes at 135° C. to 145° C.

In one embodiment of the present specification, the heat treatment process is preferably leaving the composition unattended for 60 hours to 90 hours at 30° C. to 50° C.

In one embodiment of the present specification, the adhesive film has a thickness of 10 μm to 50 μm.

In one embodiment of the present specification, the adhesive film has a thickness of 20 μm to 30 μm.

In one embodiment of the present specification, the adhesive film has a thickness of 25 μm.

In one embodiment of the present specification, the adhesive film has a relative dielectric constant of 4 or greater at 25° C., 60 RH % and 100 KHz.

<Method of Measuring Relative Dielectric Constant>

As for the relative dielectric constant of the present specification, a capacitance value (Cp) is measured using an impedance gain-phase analyzer, and the following relative dielectric constant value is calculated by the following Equation 1.

$$\varepsilon_r = \frac{C_p h}{A} \times \frac{1}{\varepsilon_0} \quad \text{[Equation 1]}$$

In Equation 1, $\varepsilon_r$ is a relative dielectric constant of the adhesive film, $C_p$ is a capacitance value (F) of the adhesive film, h is a thickness (m) of the adhesive film, A is an area (m$^2$) of an electrode attached to the adhesive film, and $\varepsilon_0$ is a vacuum dielectric constant of 8.854*10$^{-12}$ F/m.

In one embodiment of the present specification, the relative dielectric constant is preferably 4 or greater, it is preferred as the relative dielectric constant value is higher, and the value of up to 20 is possible.

In one embodiment of the present specification, when using the adhesive film having a relative dielectric constant of 4 or greater in an on-cell touch structure, touch resolution is high and a response rate is high, whereas, when the relative dielectric constant is less than 4, touch resolution decreases and sensitivity for the touch also decreases.

Other specific constitutions of a foldable display are known in, for example, Korean Patent Application Laid-Open Publication No 2015-0138450 and the like, and the present application may include such known constitutions of a foldable display without limit except for the adhesive.

In one embodiment of the present specification, the adhesive film is provided between a cover window and a touch panel, or between a touch panel and a display panel.

FIG. 2 illustrates a structure of a foldable display in which a substrate (201); a touch panel or a display panel (202); a polarizing film (203); and a cover window (204) are consecutively laminated, and the adhesive (205) of the present disclosure may be provided between each back plate and a touch panel or a display panel; between a touch panel or a display panel and a polarizing plate; or between a polarizing plate and a cover window.

Hereinafter, examples of the present disclosure will be described in detail so that those skilled in the art may readily implement the present disclosure. However, the present disclosure may be embodied in various different forms, and is not limited to the examples described herein.

EXPERIMENTAL EXAMPLE

Components and weight ratios of adhesive compositions used as examples and comparative examples of the present application are described in the following Table 1.

TABLE 1

| | | Example 1 | Example 2 | Example 3 | Comparative Example 1 | Comparative Example 2 |
|---|---|---|---|---|---|---|
| Resin Composition (Parts by Weight) | Carbitol Acrylate (CBA) | 48 | 38 | 28 | — | — |
| | Ethylhexyl Acrylate (EHA) | 50 | 60 | 70 | 98 | 50 |
| | 2-Methoxyethyl Acrylate (2-MTA) | — | — | — | — | 48 |
| | Acrylic Acid (AA) | 2 | 2 | 2 | 2 | 2 |
| | Resin Tg (° C.) | −90.7 | −89.2 | −87.6 | −83 | −67.4 |
| | Crosslinking Agent Content (pt) | 0.03 | 0.03 | 0.03 | 0.03 | 0.03 |

Example 1

To a 2 L reactor having nitrogen gas refluxed and equipped with a cooling device so as to readily control a temperature, 50 parts by weight of ethylhexyl acrylate (EHA), 48 parts by weight of carbitol acrylate (CBA) and 2 parts by weight of acrylic acid (AA) were introduced, and the result was 50% diluted with methyl ethyl ketone (MEK) and purged with nitrogen gas for approximately 1 hour. While raising the reactor temperature to 67° C., 200 ppm of 2,4-diphenyl-4-methyl-1-pentene and 200 ppm of azobisisobutyronitrile (AIBN) were introduced thereto, and a polymerization reaction was progressed for 2 hours. The polymerization was completed by injecting oxygen thereto while adding methyl ethyl ketone (MEK) so that the solid content of the polymer becomes approximately 24%, and a thermocurable resin having a molecular weight of 2,000,000 g/mol was prepared.

Solids obtained by mixing a crosslinking agent (epoxy-based crosslinking agent (BXX-5240), isocyanate-based crosslinking agent (BXX-5627)) to the obtained thermocurable resin in the above-mentioned content ratio were diluted to a solid content of approximately 15% in methyl ethyl ketone to 800 cp, and using a mechanical stirrer, the result was mixed for 15 minutes or longer. The mixture was left unattended to remove bubbles generated during the mixing, and after forming a film using an applicator, the result was dried for 3 minutes at 140° C. using a Mathis oven to obtain an adhesive film having a thickness of 25 μm.

Examples 2 and 3, and Comparative Examples 1 and 2

Adhesive compositions according to Examples 2 and 3, and Comparative Example 1 and 2 were added in the content ratios of the resin compositions described in Table 1, and a thermocurable resin and an adhesive film were prepared using the polymerization method of Example 1.

Storage modulus, a relative dielectric constant, static folding and dynamic folding of the adhesive films prepared using the above-described method were measured and shown in the following table 2.

TABLE 2

|  | Example 1 | Example 2 | Example 3 | Comparative Example 1 | Comparative Example 2 |
|---|---|---|---|---|---|
| Storage Modulus (G', Pa) @-30° C. | 3.2 × 10$^5$ | 3.5 × 10$^5$ | 3.9 × 10$^5$ | 5.8 × 10$^5$ | 1.1 × 10$^6$ |
| Storage Modulus (G', Pa) @60° C. | 1.4 × 10$^4$ | 2.0 × 10$^4$ | 2.7 × 10$^4$ | 3 × 10$^4$ | 8.8 × 10$^4$ |
| Relative Dielectric Constant (25° C., 60% RH, 100 KHz) | 5.07 | 4.74 | 4.45 | 3.64 | 4.81 |
| Static Folding (60° C., 90% RH, 2.5 R, 20 Days) | OK | OK | OK | OK | OK |
| Dynamic Folding (25° C., 2.5 R, 100,000 Times) | OK | OK | OK | OK | NG (Cracks on Hard Coating) |

The storage modulus and the relative dielectric constant were measured in the same manner as in the methods of measuring storage modulus and relative dielectric constant described in the present specification.

<Static Folding Test>

After preparing a specimen to 7.8 cm×14 cm in a 2-set_stack up structure described in FIG. 1, the specimen was folded in half, inserted to a parallel plate having a spacing of 5 mm, and left unattended under a condition of 60° C. and 90% RH. The specimen was collected after 20 days, and the degree of bubble generation and the degree of delamination were visually observed.

It was expressed as OK when there were no bubble generation and no delamination, and expressed as N.G. when there were bubbles or delamination.

The 2-set_stack up structure is a laminated structure obtained by consecutively laminating a touch panel or a display panel (101), an adhesive (PSA, 102), a polarizing film (POL, 103), an adhesive (PSA, 104), a hard coating layer (HC, 105), a polyimide layer (PI, 106) and a hard coating layer (HC, 107), and a specimen having the structure was prepared to a size of 7.8 cm×14 cm.

<Dynamic Folding Test>

A specimen was prepared in the same manner as in the static folding and inserted to a parallel plate having a spacing of 5 mm, and a test of folding and unfolding 100,000 times was conducted at 25° C. After the test, the specimen was collected, and the degree of bubble generation the degree of delamination, and cracks on the hard coating layer were visually observed.

It was expressed as OK when there were no bubble generation, no delamination and no cracks on the hard coating layer, and expressed as N.G. when there were bubbles, delamination, or cracks on the hard coating layer.

It was identified that Comparative Example 1 not including carbitol acrylate had a relative dielectric constant of less than 4, and Examples 1 to 3 including carbitol acrylate had a relative dielectric constant of 4 or greater. Accordingly, the adhesive films of Examples 1 to 3 are suitable as an adhesive for a foldable display with higher touch resolution and higher response rate compared to the adhesive film of Comparative Example 1.

In addition, Comparative Example 2 using 2-methoxyethyl acrylate instead of carbitol acrylate had cracks occurring on the hard coating layer in the dynamic folding compared to Examples 1 to 3. Accordingly, it was seen that the adhesive not including the compound satisfying Chemical Formula 1 according to one embodiment of the present specification was not suitable as an adhesive for a foldable display.

The invention claimed is:

1. An adhesive composition for a foldable display comprising:
a thermocurable resin; and
a cros slinking agent,
wherein the thermocurable resin consists of a unit derived from a compound including at least one N or O and at least one unshared electron pair in the compound, and
a unit derived from a compound including an acrylate group,
the thermocurable resin has a glass transition temperature of lower than −70° C., and
the compound including at least one N or 0 and at least one unshared electron pair in the compound is represented by the following Chemical Formula 1:

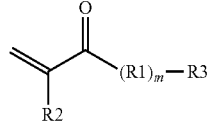

[Chemical Formula 1]

in the Chemical Formula 1,
R1 is an alkyleneoxy group;
R2 is hydrogen; an alkyl group; or a nitrile group;
R3 is an alkoxy group; and
m is an integer of 1 to 4,
wherein, with respect to 100 parts by weight of the thermocurable resin, the unit derived from the compound including at least one N or O and at least one unshared electron pair in the compound is included in 28 parts by weight to 48 parts by weight,
and
the unit derived from the compound including an acrylate group is included in 52 parts by weight to 72 parts by weight; and wherein the composition after curing has a storage modulus of $1.4 \times 10^4$ Pa to $3.9 \times 10^5$ Pa at $-30°$ C. and $60°$ C. and a relative dielectric constant of 4 or greater at $25°$ C., 60 RH % and 100 KHz.

2. The adhesive composition for a foldable display of claim 1, wherein in the Chemical Formula 1, R2 is hydrogen, R1 is an ethyleneoxy group, m is 2, and R3 is an ethoxy group.

3. The adhesive composition for a foldable display of claim 1, comprising the crosslinking agent in 0.001 part by weight to 1 part by weight with respect to 100 parts by weight of the adhesive composition for a foldable display.

4. The adhesive composition for a foldable display of claim 1, wherein the thermocurable resin has a weight average molecular weight of greater than or equal to 1,000,000 g/mol and less than or equal to 2,000,000 g/mol.

5. An adhesive film comprising a cured material of the adhesive composition for a foldable display of claim 1.

6. The adhesive film of claim 5, wherein the film has a thickness of 10 μm to 50 μm.

7. A foldable display comprising the adhesive film of claim 5.

8. The foldable display of claim 7, wherein the adhesive film is provided between a cover window and a touch panel, or between a touch panel and a display panel.

9. An adhesive film comprising a cured material of the adhesive composition for a foldable display of claim 2.

10. An adhesive film comprising a cured material of the adhesive composition for a foldable display of claim 3.

11. An adhesive film comprising a cured material of the adhesive composition for a foldable display of claim 4.

* * * * *